Patented Aug. 6, 1946

2,405,487

UNITED STATES PATENT OFFICE 2,405,487

MIXING METHOD

Robert Louis Brandt, New York, N. Y., assignor, by mesne assignments, to Robert B. Colgate, Lloyd Neck, N. Y.

No Drawing. Application April 10, 1942, Serial No. 438,415

2 Claims. (Cl. 99—71)

This invention relates to a method of preparing emulsions or dispersions, and more particularly is directed to a process of dispersing solvent freed coffee extract in dried water soluble coffee powder.

When freshly roasted ground coffee is extracted with a solvent such as ethylene oxide or liquid sulfur dioxide, a residue is obtained from the solvent solution of coffee extract after the solvent is separated that is largely water insoluble. Though the compounds comprising this residue are only in part soluble in water, it is very important to incorporate the entire residue in water soluble coffee powder so that no separation of oily compounds obtains when the coffee powder is dissolved in water. Suggestions for dispersion of the oily compounds in brewed coffee have been made, and they usually concern themselves with the addition of peptizing or dispersing agents to the mixtures. Ordinary stirring of the dry ingredients or the drying of dispersions of one in a solution of the other does not effect a satisfactory dispersion. Even in these cases the oily material separates and floats on the water when the powder is added thereto. These suggestions are unsatisfactory in that proper dispersion is seldom obtained, and in any case the dispersing agent largely masks the taste of the added coffee-extract.

One object of this invention is to mix a solvent extract of coffee with dry coffee powder in such a way that complete and homogeneous dispersion of the extract in dissolved or cup coffee occurs without separation of a substantial oily layer.

Another object is to disseminate homogeneously the coffee extract throughout a mass of substantially dry coffee powder or ground roasted coffee.

Still another object is to eliminate the necessity for the addition of any noncoffee compound or materials to the coffee blend.

It has now been found that the soluble coffee powder prepared by the aqueous extraction of roasted coffee contains compounds of unknown constitution that, under proper conditions, are able to disperse water insoluble substances such as fats, oils and the like. Furthermore it has been discovered that with the proper kind of intimate physical contact between the dispersing agent present in coffee powder and the added solvent-freed coffee-extract, cup coffee may be prepared in the regular manner that shows no signs of oil separation other than is usual and desirable in brew coffee when prepared by conventional methods, such as drip or percolator coffee.

Although it is not possible to properly incorporate very small quantities of coffee-extract with dry coffee powder by any of the usual and known mixing methods, it has now been found that by intensely vibrating the coffee powder and the oily coffee-extract, a homogeneous mixture may be made that is of such a nature that when brewed coffee is prepared a clear cup obtains and no substantial separation of an oily layer occurs.

The process of this invention comprises setting up intense high frequency displacements between the individual particles of a mass of solids coated with liquids or fluid compounds by rapid compressional and elongational forces transmitted to the subdivided solids by suitable external means. These vibrational forces should be great enough in intensity and high enough in frequency to rapidly comingle the dry coffee powder so intimately that an aqueous dispersion of the resultant mixture of coffee compounds shows substantially no separation of the dispersed oleaginous compounds. High frequency electro-magnetically formed vibrations are the preferable means for obtaining the desired physical forces required by the process of the invention. The frequencies of the vibrations can be varied over a wide range but advantageously are between about 500 and 5000 vibrations per minute. Lower frequencies are not particularly effective and higher frequencies are especially desirable with relatively viscous materials.

The following example will illustrate the process of carrying out the process of this invention.

Example I

An oleaginous coffee-extract is prepared by extracting freshly roasted coffee with liquid sulfur dioxide, separating the sulfur dioxide solution of coffee extract from the residual coffee solids, and removing the sulfur dioxide from the solution by heat and the application of vacuum. The solvent free coffee extract is dispersed in a substantially dry, water soluble coffee powder obtained by an aqueous liquid extraction of the previously solvent extracted coffee by means of the following apparatus. A half liter metal container about three inches in diameter is welded to the center of a steel bar three inches in width, three-sixteenths inch thick and ten inches long. The steel bar is rigidly attached to the vibration platform of a Syntron pulsating electromagnet capable of frequency variation up to a maximum of about 3000 vibrations per minute. The container is filled partially with 100 grams of dry water-soluble coffee powder and the electric current switched on. The coffee powder is set into violent physical motion at about 3000 vibrations per minute. The mass of powder as an entirety keeps rapidly turning over, rising vertically against a part of the container walls from one part of the bottom surface of the container to the topmost surfaces of the heaped mass of powder thence passing down the sides of the heap to the lowermost parts of the heap where the particles are again incorporated in the bottom surface of the heap. While the above description applies to the general motion of the heaped powder, it is also observed that a continuous and rapid renewal of the surface of the heap is in progress. Individual waves of particles emerge rapidly from the surface, roll a short distance downward and re-enter the heap proper. The intensely vibrating mass of powder resembles violent liquid ebullition. A very important point observed is that no classifying action, or separation of particles according to size or density obtains and also there is no tendency of the powder to stick to the walls of the container. Semi-fluid solvent freed coffee-extract (obtained by the liquid sulfur dioxide rotation of ground roasted coffee) in the amount of 0.2 gram is then added to the undulating mass of coffee powder, and vibration continued until thorough dispersion obtains. The electric current is then cut off. The resulting coffee powder is very slightly oily in appearance, free flowing and gives off the rich aromatic fragrance of the roasted coffee from which the coffee extract is prepared. The odor of the coffee powder prepared by the process of this invention is indistinguishable from that of the original roasted coffee.

When cup coffee is prepared from the powder by dissolving in water, it forms a typical coffee solution not only in color but also in appearance. Only the slightest traces of oil show on the surface of the brew. This is normal and desirable. The aroma is rich and agreeable and the taste is the same as in coffee brewed from the same roasted coffee beans when prepared in a conventional manner. On cooling to room temperature the solution prepared from the powder and hot water, shows no difference from conventionally brewed coffee. The coffee solution, either hot or cold, is compatible with cream, milk, sugar, brandy, etc.

The product that has been described by the process of this invention is new and different from anything obtained in the prior art.

*Example II*

Solvent-freed coffee extract obtained from a high quality roasted coffee by extraction with liquid ethylene oxide as in Example I is mixed and vibrated with dry coffee powder obtained by water extracting and drying a lower grade freshly roasted coffee. The aroma of a cup of coffee prepared from this powder is that of a conventionally brewed cup prepared from the higher quality roasted coffee. Not only this but the tastes of the coffees are the same. Thus, advantageous and very remarkable technical and economical possibilities are opened up.

While the examples cited are directly aimed at the preparation of substantially dry water soluble coffee powders the process is not so limited, but may be extended to include the dispersion of all liquid, plastic and solid substantially water-insoluble compounds in substantially dry powders or solids or mixtures of solids, whether the latter are water soluble en toto or not. For example it is possible similarly to disperse the solvent-freed extract in ground freshly roasted coffee. Dispersion of oils, fats and waxes, alcohols, esters and salts of organic or inorganic acids in various solids, preferably porous solids are included as well as the dispersion of catalysts in dry, divided or fluid form on solids, such as kieselguhr, silica gel or activated carbon, the dispersion of one or more fluids or oleaginous compounds, flavoring materials, solvent-freed extracts of foods, essences, coloring matter, vitamin concentrates, nutritional and esculent substances and foodstuffs and the like in food products such as non-liquid lacteal products from any source, chocolate, tea, maté, sugars, all powdered or dry subdivided fruits such as oranges, lemons, apples, etc., and vegetables such as carrots, beans, potatoes and the like, also the dispersion of inhibitors, or antioxidants, growth promoters, antiseptic protective bodies or any kind of covering agents. The process of this invention may also be applied advantageously in the preparation of pharmaceuticals and biologicals as well as in certain phases in the manufacture of dye stuffs, either at atmospheric, sub-atmospheric or higher pressures and at normal, reduced or elevated temperatures, and in the absence of oxygen or in the presence of inert gas or gases.

The means for producing an intense and rapid and continuous displacement of particles with relation to each other or simple and/or complex periodic motion, along any axis or combinations are not limited to the use of electromagnetic devices but include other means, obvious to one skilled in the art, such as high speed mechanically operated vibrators, pneumatic pulsators, rotary vibrators, and so forth.

As many widely different embodiments of the present invention may be made without departing from the spirit or scope thereof, it is to be understood that the invention is not limited except as defined by the appended claims.

I claim:

1. The process which comprises comingling and simultaneously intensely vibrating at a frequency between 500 and 5000 vibrations per minute dry solid water-soluble constituents of roasted coffee and the liquid substantially water-insoluble solvent-soluble constituents of roasted coffee to yield a divided solid product which is readily dispersible in an aqueous medium.

2. The process which comprises comingling and simultaneously intensely vibrating at a frequency of about 3000 vibrations per minute dry solid water-soluble constituents of roasted coffee and the liquid substantially water-insoluble solvent-soluble constituents of roasted coffee to yield a divided solid product which is readily dispersible in an aqueous medium.

ROBERT LOUIS BRANDT.